(12) United States Patent
Liukku et al.

(10) Patent No.: US 11,867,714 B2
(45) Date of Patent: Jan. 9, 2024

(54) ACCELEROMETER WITH TWO SEESAWS

(71) Applicant: MURATA MANUFACTURING CO., LTD., Nagaokakyo (JP)

(72) Inventors: Matti Liukku, Helsinki (FI); Ville-Pekka Rytkönen, Klaukkala (FI); Anssi Blomqvist, Helsinki (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/843,427

(22) Filed: Jun. 17, 2022

(65) Prior Publication Data

US 2023/0003760 A1    Jan. 5, 2023

(30) Foreign Application Priority Data

Jul. 5, 2021 (FI) ...................................... 20215784

(51) Int. Cl.
*G01P 15/125* (2006.01)
*G01P 15/08* (2006.01)

(52) U.S. Cl.
CPC .... *G01P 15/125* (2013.01); *G01P 2015/0831* (2013.01)

(58) Field of Classification Search
CPC .................................................... G01P 15/125
USPC ........................................................ 73/514.32
See application file for complete search history.

(56) References Cited

U.S. PATENT DOCUMENTS

| 8,539,836 | B2  |   | 9/2013 | NcNeil |           |
|-----------|-----|---|--------|--------|-----------|
| 9,606,191 | B2  | * | 3/2017 | Seeger | G01P 15/08 |
| 2010/0024554 | A1 |  | 2/2010 | Classen et al. | |
| 2013/0192362 | A1 | * | 8/2013 | Rytkonen | G01P 15/08 |
| | | | | | 73/504.08 |
| 2019/0049482 | A1 |  | 2/2019 | Motiee | |
| 2019/0162747 | A1 |  | 5/2019 | Thompson et al. | |
| 2019/0339078 | A1 |  | 11/2019 | McNeil | |

(Continued)

FOREIGN PATENT DOCUMENTS

| JP | 2015-509189 A  | 3/2015  |
|----|----------------|---------|
| WO | 2013/104828 A1 | 7/2013  |
| WO | 2019/209659 A1 | 10/2019 |

OTHER PUBLICATIONS

Finnish Search Report dated Jan. 20, 2022 corresponding to Finnish U.S. Appl. No. 20/215,784.

(Continued)

*Primary Examiner* — Walter L Lindsay, Jr.
*Assistant Examiner* — Philip T Fadul
(74) *Attorney, Agent, or Firm* — SQUIRE PATTON BOGGS (US) LLP

(57) ABSTRACT

An accelerometer for measuring acceleration in the direction of a z-axis which is perpendicular to an xy-plane, where a first proof mass is suspended from a first side anchor point with a first suspension structure which allows the first proof mass to undergo rotation about a first rotation axis. A second proof mass is suspended from a second side anchor point with a second suspension structure. The second suspension structure allows the second proof mass to undergo rotation about a second rotation axis. The torsion elements in the first and second suspension structure lie further away from the center of the accelerometer than the corresponding side anchor points from which the masses are suspended.

15 Claims, 8 Drawing Sheets

(56) References Cited

U.S. PATENT DOCUMENTS

2020/0018777 A1* 1/2020 Liukku ................ G01P 15/125

OTHER PUBLICATIONS

European Search Report dated Nov. 14, 2022, corresponding to European Patent Application No. 22177360.
Japanese Office Action, with English language translation, corresponding to JP Application No. 2022-100694, dated Jun. 6, 2023.

* cited by examiner

ACCELEROMETER WITH TWO SEESAWS

FIELD OF THE DISCLOSURE

The present disclosure relates to microelectromechanical (MEMS) devices for measuring acceleration, and more particularly to accelerometers comprising proof masses which can rotate in seesaw motion out of a device plane when the accelerometer undergoes acceleration in a direction which is perpendicular to a device plane.

BACKGROUND OF THE DISCLOSURE

A MEMS accelerometer typically comprises a device wafer or alternatively a device layer deposited on a substrate where micromechanical structures are formed by etching. The device wafer or layer defines a device plane. In this disclosure, the device plane will be illustrated as the xy-plane.

A proof mass formed in the device wafer or layer can be configured to respond to acceleration in the direction of a z-axis (which is perpendicular to the xy-plane) by rotating in seesaw motion about a rotation axis which lies in the xy-plane. The proof mass needs to be asymmetric with respect to this rotation axis, so that it's center of mass does not lie on the axis. The proof mass may be suspended from fixed anchor points by suspenders which are sufficiently thin to undergo torsional twisting when the accelerometer experiences acceleration in the z-direction and the proof mass begins to turn out of the xy-plane.

A general problem in microelectromechanical devices is that suspension arrangements which are designed to allow a certain mode of motion will also allow other modes. Many of these additional modes will be undesired because they disturb the acceleration measurement.

U.S. Pat. No. 8,539,836 discloses an accelerometer where two proof masses are suspended side by side to rotate out of the device plane in seesaw motion. In this suspension arrangement the proof masses are liable to undergo parasitic oscillation due to the influence of external vibrations. Such parasitic oscillation may disturb the out-of-plane measurement.

BRIEF DESCRIPTION OF THE DISCLOSURE

An object of the present disclosure is to provide an apparatus which alleviates the above disadvantage. The object of the disclosure is achieved by what is stated in the independent claim. The preferred embodiments of the disclosure are disclosed in the dependent claims.

The disclosure is based on the idea of suspending two adjacent proof masses for out-of-plane seesaw motion with torsion elements which are distant from each other. An advantage of this arrangement is that the suspension structure can more stiffly resist vibrations in the device plane.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

Figure 1A:
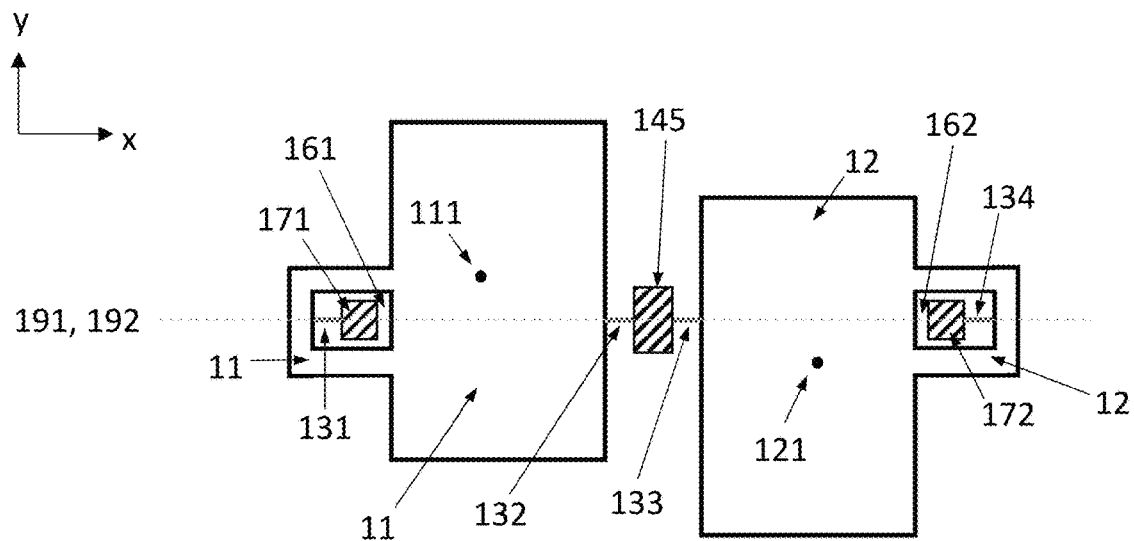
FIGS. 1a and 1b illustrate accelerometers with two different designs.

This disclosure describes an accelerometer for measuring acceleration in the direction of a z-axis which is perpendicular to an xy-plane. The accelerometer comprises a first proof mass and a second proof mass. The first proof mass is adjacent to the second proof mass. The accelerometer further comprises one or more central anchor points located substantially between the first proof mass and the second proof mass. The accelerometer further comprises a first side anchor point and a second side anchor point.

The first proof mass is suspended from the first side anchor point and from the one or more central anchor points with a first suspension structure. The first suspension structure allows the first proof mass to undergo rotation about a first rotation axis. The second proof mass is suspended from the one or more central anchor points and from the second side anchor point with a second suspension structure. The second suspension structure allows the second proof mass to undergo rotation about a second rotation axis. The first and the second rotation axes are parallel to each other and define an x-direction which is parallel to the first and the second rotation axes and a y-direction which is perpendicular to the x-direction.

The x-coordinate of the second side anchor point is greater than the x-coordinate of the first side anchor point. The y-coordinate of the center of mass of the first proof mass is greater than the y-coordinate of the first rotation axis. The y-coordinate of the center of mass of the second proof mass is less than the y-coordinate of the second rotation axis.

The first suspension structure comprises a first torsion element which is attached between the first side anchor point and the first proof mass. The first suspension structure also comprises a second torsion element which is attached between one of the one or more central anchor points and the first proof mass.

The second suspension structure comprises a third torsion element which is attached between one of the one or more central anchor points and the second proof mass. The second suspension structure also comprises a fourth torsion element which is attached between the second side anchor point and the second proof mass.

The x-coordinate of the center of the first torsion element is less than the x-coordinate of the first side anchor point. The x-coordinate of the center of the fourth torsion element is greater than the x-coordinate of the second side anchor point.

In this disclosure the device plane is illustrated and referred to as the xy-plane. The device plane is determined by the device wafer or layer where proof masses and suspension structures are formed by etching. The vertical z-axis is perpendicular to the xy-plane. Motion where the center of gravity of a proof mass moves in a vertical direction may be referred to as out-of-plane motion, or motion out of the device plane. Motion where the center of gravity of a proof mass moves in the xy-plane may be referred to as in-plane motion, or motion in the device plane. The center of gravity of each proof mass may lie in the device plane when the proof mass is in its rest position.

The micromechanical structures which form the mobile parts (such as proof masses and flexible suspenders) of the accelerometer can be prepared in the device wafer by etching the wafer. When the structures are completed, the fixed parts of the device wafer form a supporting body which typically surrounds the mobile parts in the device plane. The device wafer may be a silicon wafer. The partly mobile parts may be manufactured from the device wafer by etching the wafer. The device wafer may require structural support from a separate, much thicker wafer during manufacturing and/or in the finished component. These thicker wafers may be called handle wafers or support wafers. Similar arrangements can be used when a device layer is etched.

Each of the first and second proof masses forms a seesaw, which may also be called a teeter-totter. Each seesaw responds to acceleration in the direction of the z-axis with out-of-plane rotation. If the seesaws are not coupled to each other, the response of each seesaw is independent of the response of the other. The accelerometer can be made more robust by coupling the two to each other, so that they move in unison in response to acceleration along the z-axis.

Anchor points are fixed structures which do not undergo any movement with respect to the fixed surroundings of the accelerometer when the device undergoes acceleration. The proof masses are suspended from these anchor points with suspension structures. These suspension structures include at least some flexible parts, such as the torsionally flexible torsion elements. The suspension structures may also include substantially rigid extension parts which may be fixed at one end to an anchor point. The extension bars are dimensioned so that they undergo far less elastic deformation than the flexible parts when the device is in operation.

The parts of the suspension structure which flexibly allow out-of-plane motion are referred to as torsion elements in this disclosure. As illustrated in the figures of this disclosure, they may be torsion bars which are narrow in the direction which is perpendicular to the corresponding rotation axis. Other torsionally flexible structures, like e.g. meander springs, could alternatively be used. In the figures of this disclosure each torsion element in a suspension structure lies on the corresponding rotation axis. However, a torsion element can alternatively comprise two or more torsionally flexible parts on different sides of the axis, and in that case none of these parts needs to lie exactly on the rotation axis. This option has not been illustrated, but it could be implemented for any torsion element.

The first torsion element may be aligned on the first rotation axis, the second torsion element may be aligned on the first rotation axis, the third torsion element may be aligned on the second rotation axis and the fourth torsion element may be aligned on the second rotation axis. However, for the reasons presented above these alignments are optional. Any of these torsion elements could alternatively be implemented so that they are not aligned on the corresponding rotation axis. The center of gravity of each proof mass lies off its rotation axis. The suspension arrangement can be configured to allow torsional twisting about the rotation axis. By dimensioning the suspension arrangement suitably, it allows the proof mass to rotate when a given minimum amount of z-axis acceleration is exceeded. The proof mass undergoes a predesigned amount of out-of-plane rotation in response to z-axis acceleration of a certain magnitude. The torsional stiffness of the suspension arrangements can be selected so that suitable tilt angles are obtained in the range of z-axis acceleration values where the sensor is expected to operate. The tilt angle of a proof mass can be measured capacitively with sensing electrodes attached to the proof mass and to an opposing fixed structure. The magnitude of the acceleration can be calculated from this measurement.

FIG. 1a illustrates an accelerometer. The illustrated x-axis here shows the positive x-direction, i.e. the direction in which the x-coordinate increases. A first proof mass 11 is suspended from a first side anchor point 171 and a central anchor point 145. A second proof mass 12 is suspended from a second side anchor point 172 and the central anchor point 145. Only one central anchor point 145 is illustrated in FIG. 1a, but multiple central anchor points could alternatively be used and the first and second proof masses 11 and 12 could be suspended from different central anchor points. If the accelerometer comprises more than one central anchor points, then said more than one central anchor points may be adjacent to each other and they may be located between the first proof mass and the second proof mass.

In FIG. 1a the y-axis illustrates the positive y-direction, i.e. the direction in which the y-coordinate increases. The y-coordinate of the center of mass 111 of the first proof mass 11 is therefore greater than the y-coordinate of the first rotation axis 191, while the y-coordinate of the center of mass 121 of the second proof mass 12 is less than the y-coordinate of the second rotation axis 192. The first and second proof masses will therefore rotate in opposite out-of-plane directions when the accelerometer undergoes acceleration in the z-direction which is perpendicular to the xy-plane.

The first suspension structure which suspends the first proof mass here comprises a first torsion element 131 which extends between the first side anchor point 171 and the first proof mass 11. The first suspension structure also comprises a second torsion element 132 which extends between the central anchor point 145 and the first proof mass 11.

The second suspension structure which suspends the second proof mass correspondingly comprises a third torsion element 133 which extends between the central anchor point 145 and the second proof mass 12. The second suspension structure also comprises a fourth torsion element 134 which extends between the second side anchor point 172 and the second proof mass 12.

FIG. 1a also illustrates the center of mass 111 of the first proof mass 11 and the center of mass 121 of the second proof mass 12. The first and second rotation axes are indicated with reference numbers 191 and 192, respectively.

The x-coordinate of the center of the first torsion element 131 is less than the x-coordinate of the first side anchor point 171. The x-coordinate of the center of the fourth torsion element 134 is greater than the x-coordinate of the second side anchor point 172. This has the advantage that the first torsion element 131 can be placed far from the second torsion element 132 in the x-direction, and the third torsion element 133 can be placed far from the fourth torsion element 134 in the x-direction. Placing these parts far away from each other raises the resonance frequencies of parasitic oscillation modes, for example modes where the proof mass rotates about the z-axis or the y-axis. It also reduces the bending which may occur in the proof mass when the accelerometer undergoes motion in the y- or z-direction. The risk that external disturbances or proof mass bending would influence the z-acceleration measurement is thereby reduced.

It is typically advantageous to place the first and second side anchor points and the one or more central anchor points close to each other. Mechanical stresses will then influence the proof masses in approximately the same way. The effect of such stress can then often be cancelled (at least to some extent) in a differential measurement.

Figure 1B:
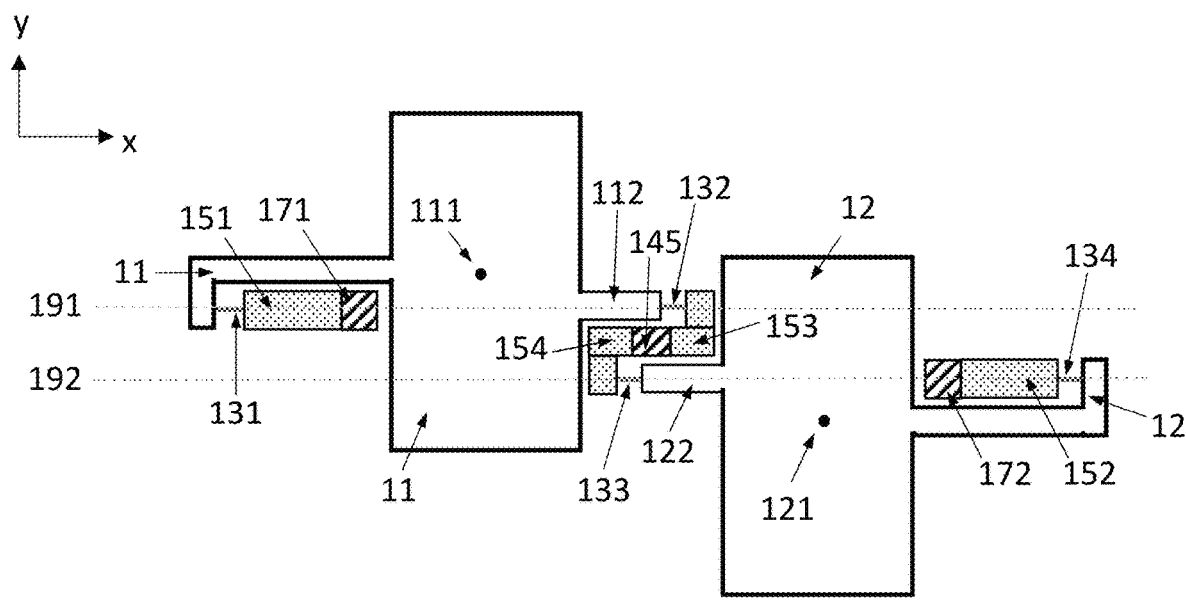

The first suspension structure may comprise a substantially rigid first extension bar which extends from the first side anchor point to the first torsion element. The second suspension structure may comprise a substantially rigid second extension bar which extends from the second side anchor point to the fourth torsion element. FIG. 1b illustrates an accelerometer where the first suspension structure comprises a substantially rigid extension bar 151 which lies on the first rotation axis 191 and extends from the first side anchor point 171 to the first torsion element 131. The second suspension structure also comprises a second substantially rigid extension bar 152 which lies on the second rotation axis 192 and extends from the second side anchor point 172 to the fourth torsion element 134. The side anchor points and the extension bars can be placed within an opening 161/162 in the corresponding proof mass, as in FIG. 1a. More generally, one part of the first suspension structure may be located within an opening 161 in the first proof mass 11 and one part of the second suspension structure may be located within an opening 162 in the second proof mass 12. The first and second proof masses 11 and 12 could alternatively have a shape which allows the torsion elements 131 and 134 to be placed on the rotation axes even though the proof masses do not fully surround the corresponding suspension structure.

FIG. 1b also illustrates another option which can be implemented independently of the extension bars: the first and second suspension arrangements may comprise additional rigid bars 153-154 which flank the one or more central anchor points 145 on one side, two sides, three sides, or all four sides. These additional rigid bars 153-154 may be connected to the second and third torsion elements 132-133, respectively. These torsion elements may in turn be connected to protrusions 112 and 122 in the first and second proof masses 11 and 12, respectively. Each protrusion 112 and 122 extends toward the other proof mass.

In FIG. 1a the x-coordinate of the center of the third torsion element 133 is greater than the x-coordinate of the center of the second torsion element 132. FIG. 1b illustrates that, with the help of additional rigid bars 153-154 and protrusions 112 and 122, the x-coordinate of the center of the third torsion element 133 may alternatively be less than the x-coordinate of the center of the second torsion element 132.

FIG. 1b also illustrates that when the halves of the first and second suspension structures which are located around the one or more central anchor points comprise additional extension bars and protrusions, the first and second rotation axes 191 and 192 do not necessarily have to coincide.

Even if no additional extension bars and protrusions would be used, the first and second rotation axes 191 and 192 could still be set to different y-coordinates by implementing a first central anchor point 19 (for the first suspension structure) on the first rotation axis 191 and a second central anchor point (for the second suspension structure) on the second rotation axis 192. This option has not been illustrated.

The first rotation axis may cross both the first proof mass and the second proof mass. Similarly, the second rotation axis may cross both the second proof mass and the first proof mass.

The options described above with reference to FIGS. 1a and 1b apply to all embodiments presented below.

Figure 2A:
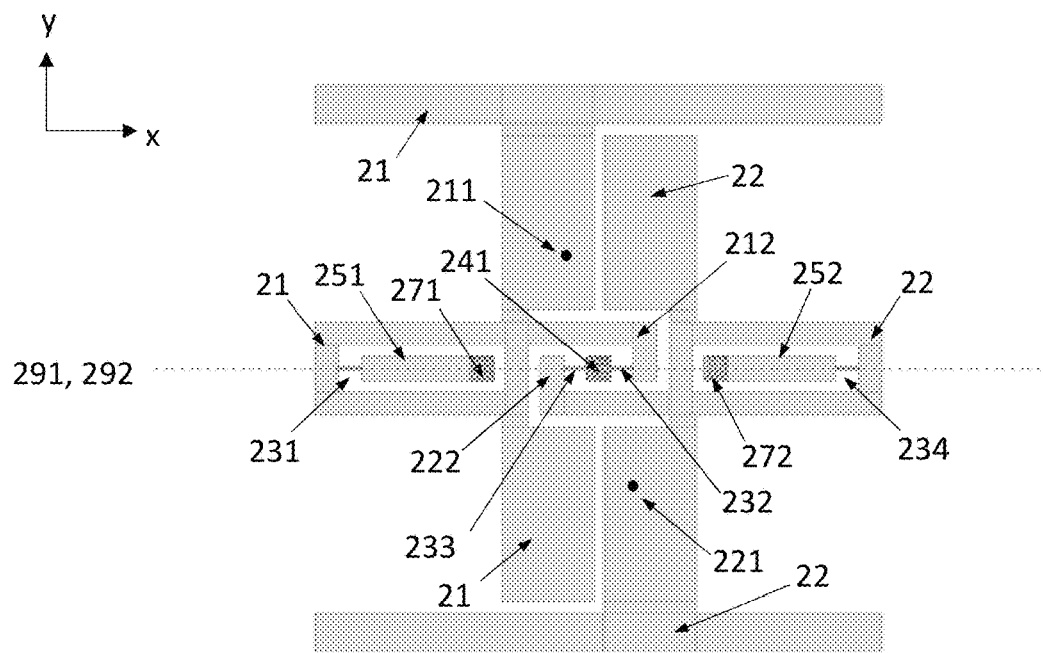
FIGS. 2a-2b illustrate accelerometers where the first and second rotation axes coincide and corresponding central anchoring arrangements.

FIG. 2a illustrates an accelerometer where reference numbers 21, 211, 212, 22, 221, 222, 231-234, 251-252, 271-272, 291-292 correspond to reference numbers 11, 111, 112, 12, 121, 122, 131-134, 151-152, 171-172, 191-192, respectively, in FIGS. 1a and 1b.

Figure 2B:
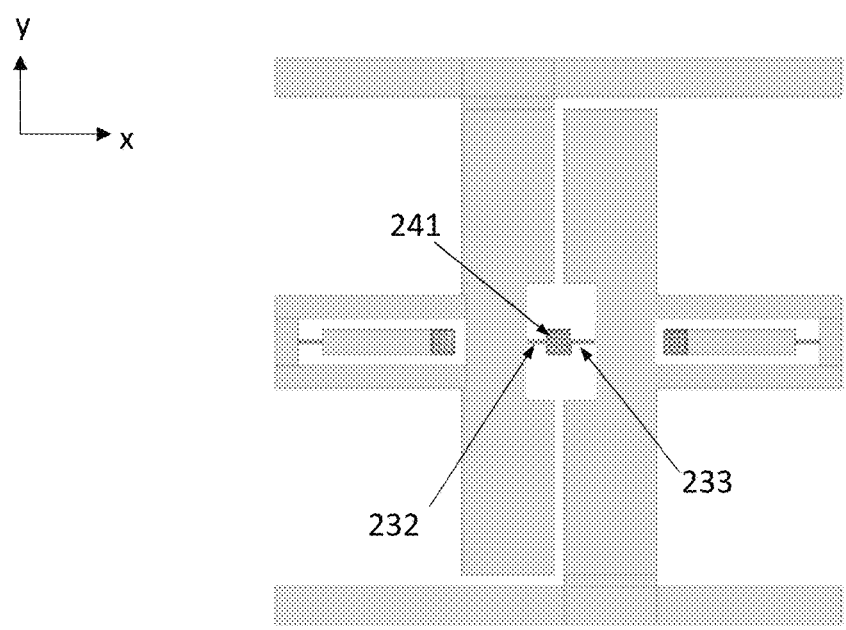

In FIG. 2a the one or more central anchor points comprise one central anchor point 241, and the x-coordinate of the one central anchor point 241 lies between the x-coordinate of the center of the second torsion element 232 and the x-coordinate of the center of the third torsion element 233. The x-coordinate of the center of the third torsion element 233 is less than the x-coordinate of the center of the second torsion element 232, but it could alternatively be greater than the x-coordinate of the center of the second torsion element 232. This latter option is illustrated in FIG. 2b. Furthermore, the one or more central anchor points could alternatively comprise two central anchor points, so that the second and third torsion elements are attached to different anchor points. This option has not been separately illustrated.

Furthermore, in FIG. 2a the first (291) and the second (292) rotation axes coincide. The first proof mass 21 comprises a protrusion 212 which extends toward the second proof mass 22, past the central anchor point 241 and to the first rotation axis 291. The second proof mass 22 comprises a protrusion 222 which extends toward the first proof mass 21, past the central anchor point 241 and to the second rotation axis 292. However, protrusions are not necessarily needed—this depends on the size and shape of the proof masses and on the opening between them.

The first side anchor point, the second side anchor point and the one central anchor point all lie on the first and the second rotation axes in FIG. 2a. Alternatively, the first and second side anchor points 271-272 could be placed away from the first and second rotation axes 291-292, but the rigid extension bars 251 and 252 could be shaped so that the first and fourth torsion elements 231 and 234 still lie on the first and second rotation axes 291-292, as they do in FIG. 2a. This alternative can be employed in any embodiment described in this disclosure.

Figure 2C:
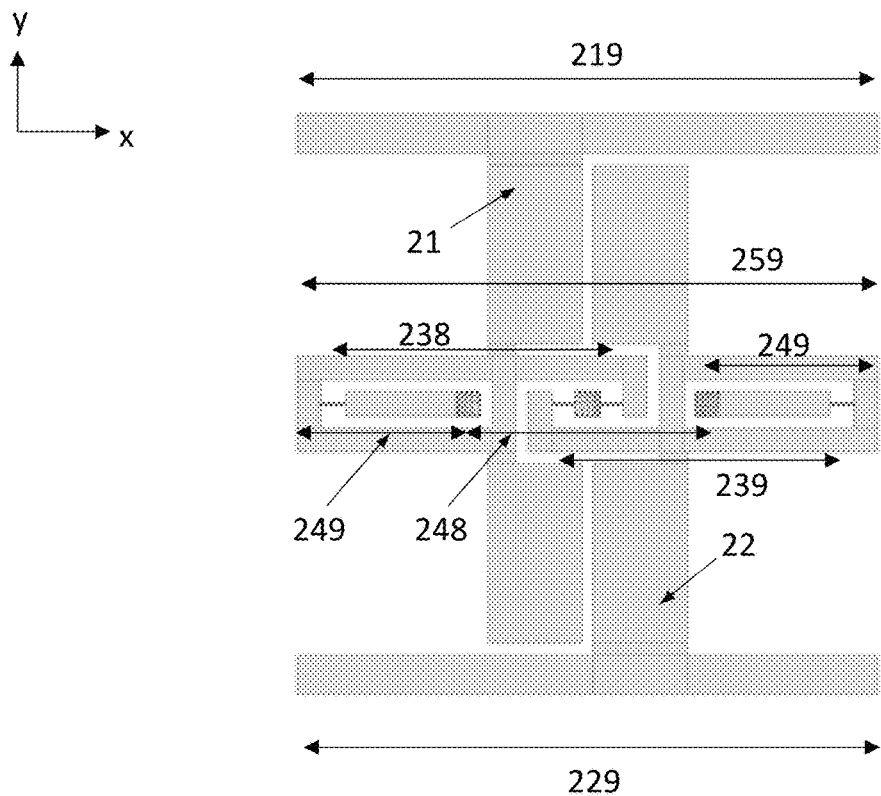
FIG. 2c illustrates various dimensions in the accelerometer.

FIG. 2c illustrates distances. The distance 238 in the x-direction from the first torsion element 231 to the second torsion element 232 may be compared to the maximum width 219 of the first proof mass 21. Correspondingly, the distance 239 in the x-direction from the third torsion element 233 to the fourth torsion element 239 may be compared to the maximum width 229 of the second proof mass 22. The ratios 238/219 and 239/229 may for example be greater than 0.5, greater than 0.75 or greater than 1. Furthermore, the portion of the width 219 which falls between the x-coordinates of the first torsion element 231 and the second torsion element 232 may be greater than 50%, greater than 75% or greater than 90%. Similarly, the portion of the width 229 which falls between the x-coordinates of the third torsion element 233 and the fourth torsion element 234 may be greater than 50%, greater than 75% or greater than 90%. These distance options apply to all embodiments presented in this disclosure.

The rigid extension bars 251 and 252 allow the distances 238 and 239 to be increased without having to place the first and second side anchor points 271 and 272 very far from the one or more central anchor points. The distance 248, illustrated in FIG. 2c, between the first side anchor point 271 and the second anchor point 272 may for example be less than the distance 249 between the first side anchor point 271 and the edge of the first proof mass on the rotation axis and the corresponding distance between the second proof mass and the second side anchor point. Alternatively, the distance 248 may be less than two times or less than three times the distance 249.

The width of the entire accelerometer structure in the x-direction, from the left edge of the first proof mass 21 to the right edge of the second proof mass 22, is indicated with reference number 259 in FIG. 2c. In this figure the width 259 is equal to the maximum widths 219 and 229 of the two proof masses because both proof masses because the left edges and right edges of both proof masses coincide, but the width 259 could also be greater than each of the widths 219 and 229 if the proof mass edges do not coincide in this way. The ratio 248/259 may for example less than 70%, less than 60%, less than 50%, less than 40% or less than 40%.

All distance options presented above are applicable to all embodiments presented in this disclosure.

Figure 3:
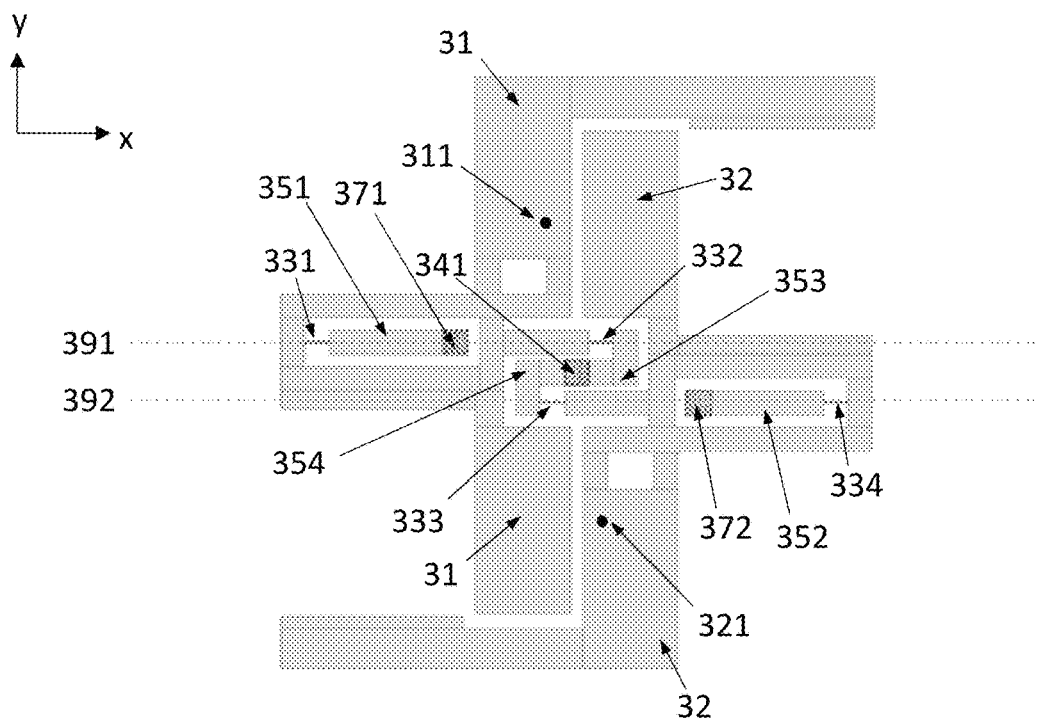
FIGS. 3-4 illustrate accelerometers where the y-coordinate of the first rotation axis is greater than the y-coordinate of the second rotation axis and a corresponding central anchoring arrangement.

FIG. 3 illustrates an accelerometer where reference numbers 31, 311, 32, 321, 331-334, 351-352, 371-372 and 391-392 correspond to reference numbers 11, 111, 12, 121, 131-134, 151-152, 171-172, 191-192, respectively, in FIGS. 1a-1b.

As in FIG. 2a, the one or more central anchor points comprise one central anchor point 341, and the x-coordinate of the one central anchor point 341 lies between the x-coordinate of the center of the second torsion element 332 and the x-coordinate of the center of the third torsion element 333. The x-coordinate of the center of the third torsion element 333 is less than the x-coordinate of the center of the second torsion element 332, but it could alternatively be greater than the x-coordinate of the center of the second torsion element 332 (as in FIG. 1a).

The device in FIG. 3 differs from the one in FIG. 2a in that the y-coordinate of the first rotation axis 391 is greater than the y-coordinate of the second rotation axis 392. The y-coordinate of the central anchor point 341 lies between the y-coordinate of the first rotation axis 391 and the y-coordinate of the second rotation axis 392. The first suspension arrangement comprises a rigid third extension bar 353 which extends from the central anchor point 341 to the first rotation axis 391. The second torsion element 332 extends from the third extension bar 353 to the first proof mass 31. Correspondingly, the second suspension arrangement comprises a rigid fourth extension bar 354 which extends from the central anchor point 341 to the second rotation axis 392. The third torsion element 333 extends from the fourth extension bar 354 to the second proof mass 32.

Figure 4:
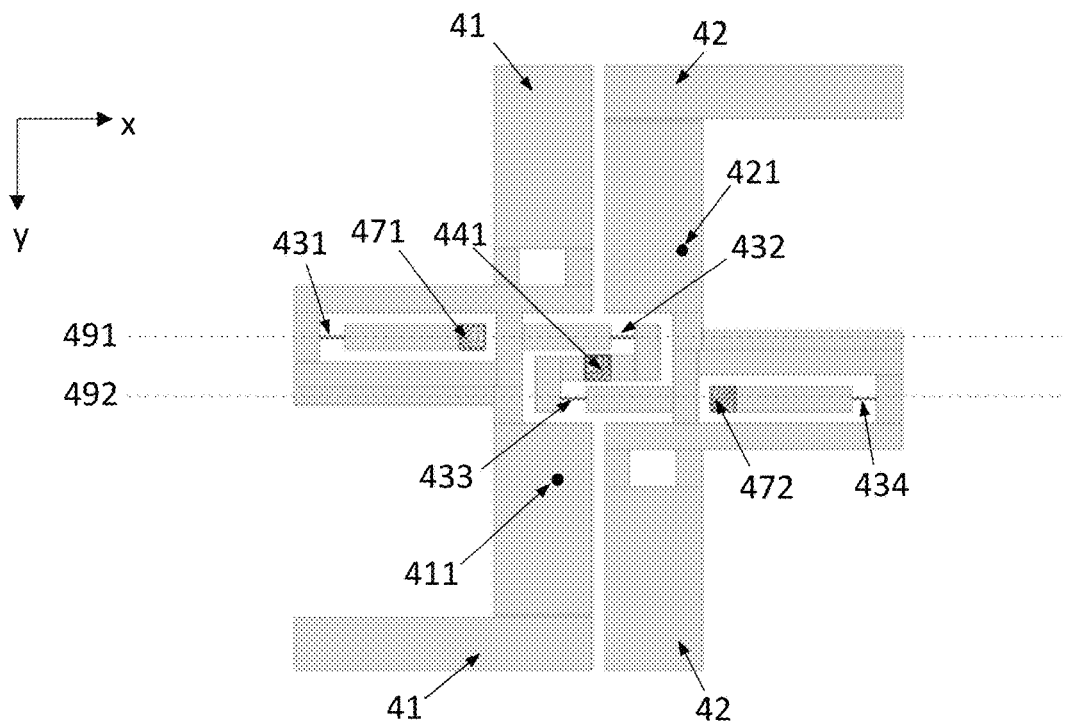

It would also be possible to arrange the rotation axes so that the y-coordinate of the first rotation axis is less than the y-coordinate of the second rotation axis. This option has been illustrated in FIG. 4, where reference numbers 41, 411, 42, 421, 431-434 471-472 and 491-492 correspond to reference numbers 11, 111, 12, 121, 131-134 171-172 and 191-192, respectively, in FIGS. 1a-1b. The positive y-direction is in this figure downward. The y-coordinate of the central anchor point 441 can in this arrangement lie between the y-coordinates of the rotation axes 491-492. The first and second suspension arrangements may comprise third and fourth extension bars which extend to the corresponding rotation axes and to protrusions in the first and second proof masses in the manner which was described above.

In general, the first side anchor point may lie on the first rotation axis, the second side anchor point may lie on the second rotation axis and the y-coordinate of the one central anchor point may lie between the y-coordinate of the first rotation axis and the y-coordinate of the second rotation axis.

Figure 5A:
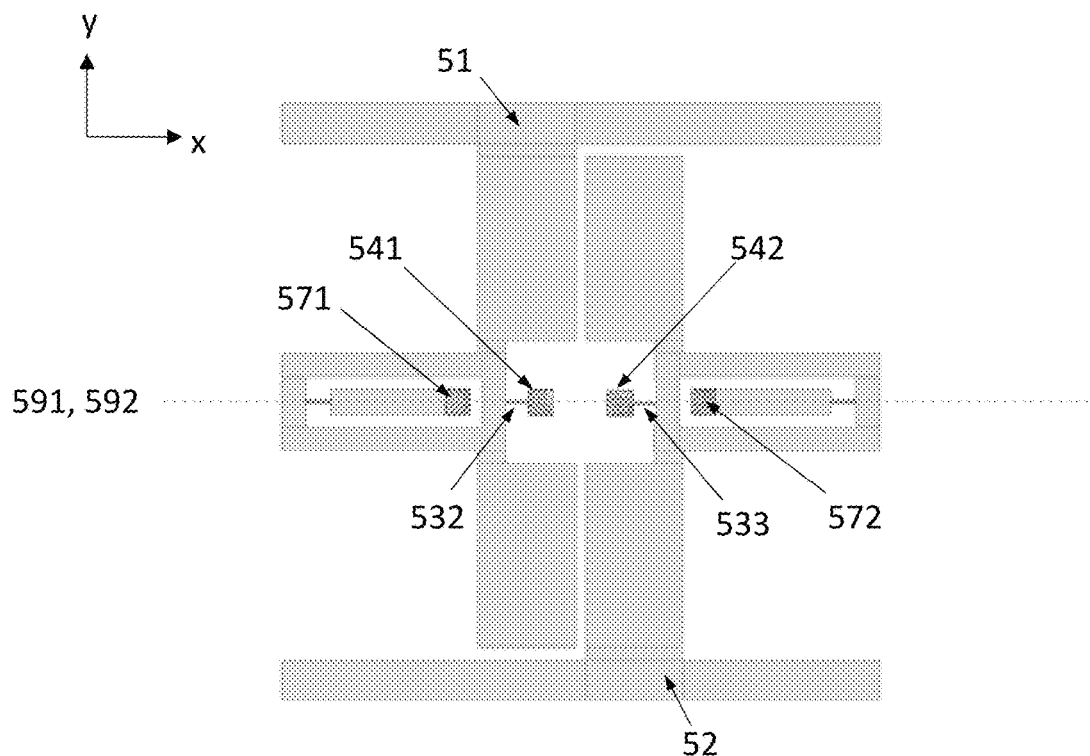
FIGS. 5a-5c illustrate alternative central anchoring arrangements.
Figure 5B:
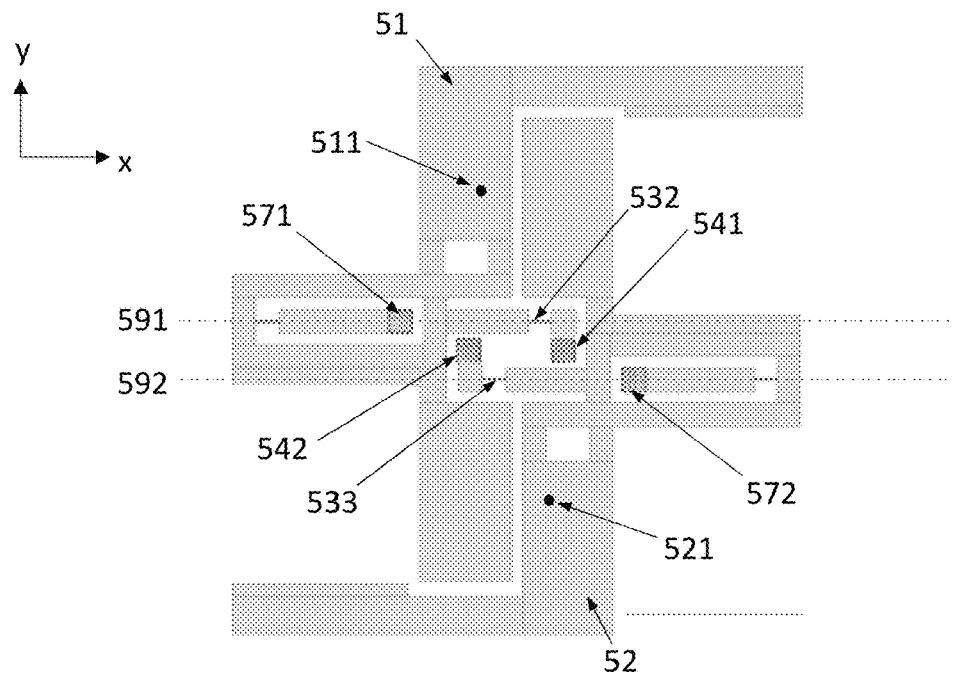
Figure 5C:
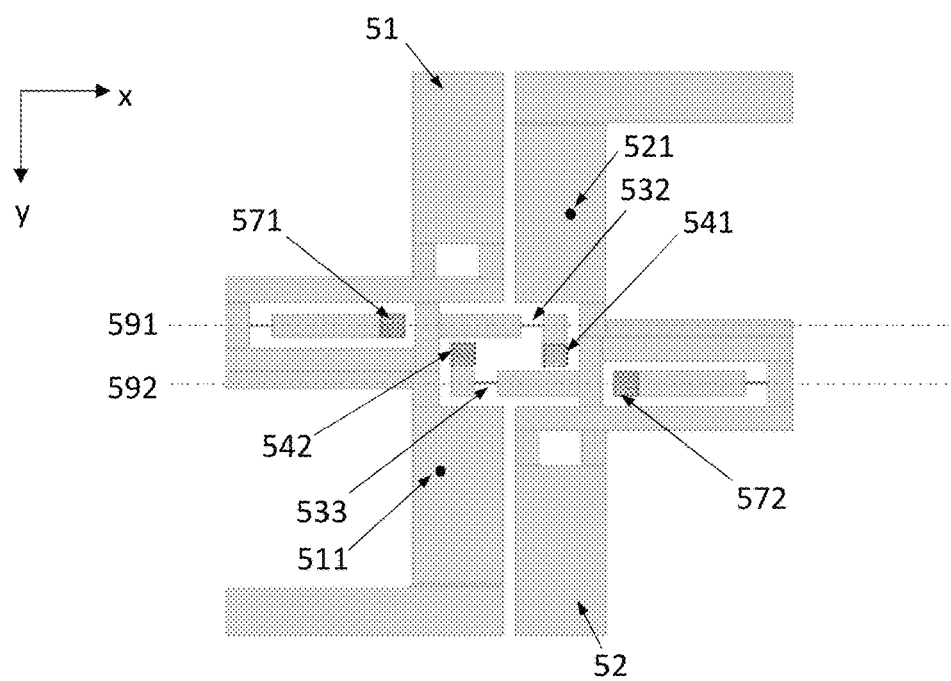

FIGS. 5a-5c illustrate accelerometers where reference numbers 51-52, 511, 521, 532-533, 571-572 and 591-592 correspond to reference numbers 11-12, 111, 121, 132-133, 171-172 and 191-192, respectively, in FIG. 1a. In all of these figures, the one or more central anchor points comprise a first central anchor point 541 and a second central anchor point 542. The second torsion element 532 is attached between the first central anchor point 541 and the first proof mass 51. The third torsion element 533 is attached between the second central anchor point 542 and the second proof mass 52.

In FIG. 5a the first and the second rotation axes 591-592 coincide. The first side anchor point 571, the second side anchor point 572, the first central anchor point 541 and the second central anchor point 542 all lie on the first and the second rotation axes 591/592. The x-coordinate of the second torsion element 532 is less than the x-coordinate of the first central anchor point 541, and the x-coordinate of the third torsion element 533 is greater than the x-coordinate of the second central anchor point 542. The first and second central anchor points could alternatively be located away from the first and second rotation axes 591 and 592, and rigid extension bars could extend from these central anchor points to the first and second rotation axes.

In FIG. 5b the y-coordinate of the first rotation axis 591 is greater than the y-coordinate of the second rotation axis 592. In FIG. 5c, the y-coordinate of the first rotation axis is less than the y-coordinate of the second rotation axis. In both figures, the first side anchor point 571 lies on the first rotation axis 591, the second side anchor point 572 lies on the second rotation axis 592, and the y-coordinates of the first (541) and second (542) central anchor points lie between the y-coordinate of the first rotation axis 591 and the y-coordinate of the second rotation axis 592. Extension bars extend from these central anchor points to the corresponding rotation axis. Furthermore, in both FIGS. 5b and 5c the x-coordinate of the second torsion element 532 is less than the x-coordinate of the first central anchor point 541 and the x-coordinate of the third torsion element 533 is greater than the x-coordinate of the second central anchor point 542.

Alternatively to the arrangement presented in FIGS. 5b and 5c, the first central anchor point 541 could be placed on the first rotation axis 591, the second torsion element 532 could be attached directly between the first central anchor point 541 and the first proof mass 51, the second central anchor point 542 could be placed on the second rotation axis 592 and the third torsion element 533 could be attached directly between the second central anchor point 542 and the second proof mass 52.

Figure 6A:
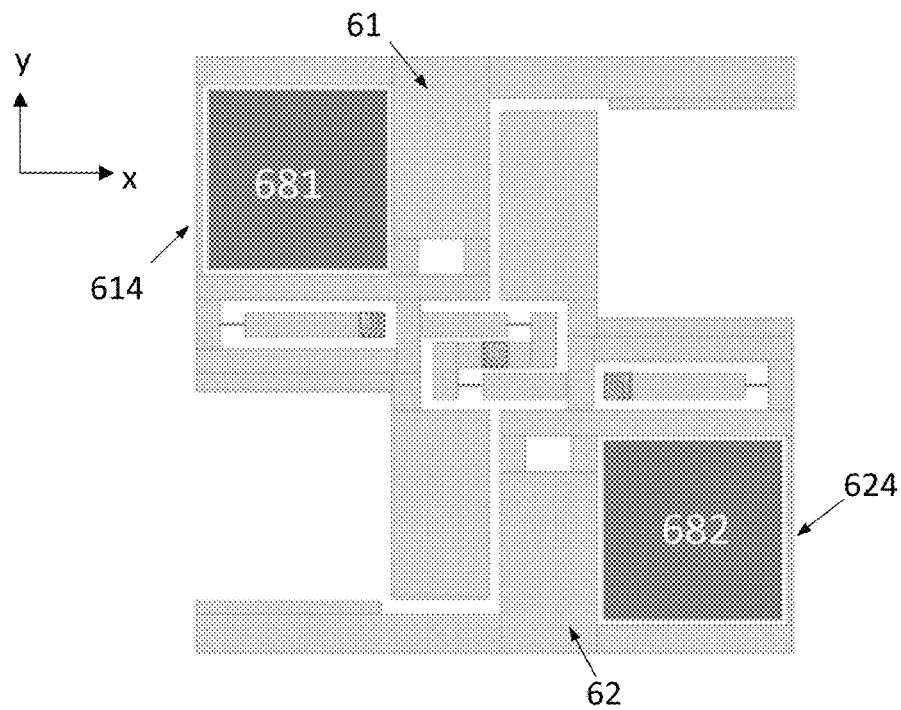
FIGS. 6a-6b illustrate accelerometers with additional elements for measuring acceleration in the direction of the x-axis and/or the y-axis.

FIG. 6a illustrates an accelerometer which comprises a first (681) and a second (682) element for measuring acceleration in the direction of the x-axis and/or the y-axis. The first element 681 may be located in a first opening in the first proof mass 61, and the second element (682) may be located in a first opening in the second proof mass 62. In other words, the first proof mass 61 surrounds the first element 681 on all sides and the second proof mass 62 surrounds the second element 682 on all sides. The first element 681 may be located near the outer (left) edge of the first proof mass 61, and the first proof mass 61 may comprise a connecting section 614 which is narrow in the x-direction, extends on the outside of the first element 681 and connects the middle part of the first proof mass (which lies close to the first rotation axis) to one end of the first proof mass 61. The second element 682 may correspondingly be located near the outer (right) edge of the second proof mass 62, and the second proof mass 62 may comprise a connecting section 624 which extends on the outside of the second element 682 and connects the middle part of the second proof mass to one end of the second proof mass. The first and second elements 681 and 682 may be any kind of acceleration sensor which is configured to measure acceleration in the direction of the x-axis, in the direction of the y-axis or in both of these directions.

Figure 6B:
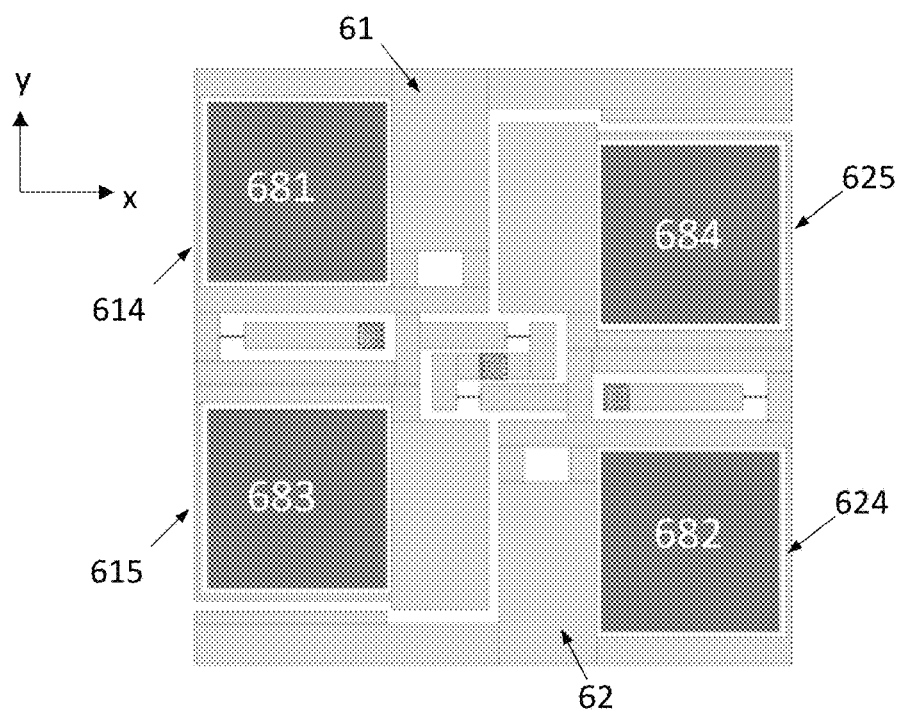

FIG. 6b illustrates an accelerometer which comprises a third (683) and a fourth (684) element for measuring acceleration in the direction of the x-axis and/or the y-axis. The third element (683) is located in a second opening in the first proof mass 61. The fourth element (684) is located in a second opening in the second proof mass 62. In other words, the first proof mass 61 surrounds the third element 683 on all sides and the second proof mass 62 surrounds the fourth element 684 on all sides. The first and third elements 681 and 683 may be located near the outer (left) edge of the first proof mass 61, and the first proof mass 61 may comprise connecting sections 614-615 which are narrow in the x-direction, extend on the outside of the first and third element 681 and 683, respectively and connect the middle part of the first proof mass 61 to the two opposing ends of the first proof mass. The second and fourth elements 682 and 684 may correspondingly be located near the outer (right) edge of the second proof mass 62, and the second proof mass 62 may comprise connecting sections 624-625 which extend on the outside of the second and fourth elements 682 and 684, respectively, and connect the middle part of the second proof mass 62 to the two opposing ends of the second proof mass. Again, the third and fourth elements 683 and 684 may be any kind of acceleration sensor which is configured to measure acceleration in the direction of the x-axis, in the direction of the y-axis or in both of these directions. The embodiments illustrated in FIGS. 6a-6b can be combined with any other embodiment presented in this disclosure.

Figure 7A:
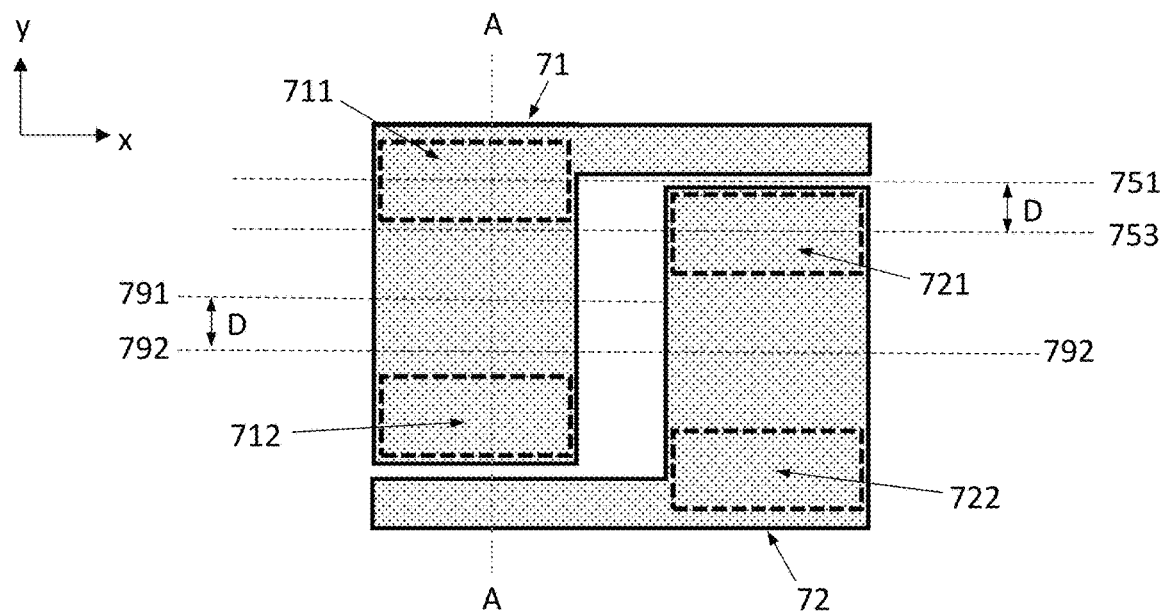
FIGS. 7a-7c illustrate a measurement geometry which can be used if the first and second rotation axes do not coincide.
Figure 7B:
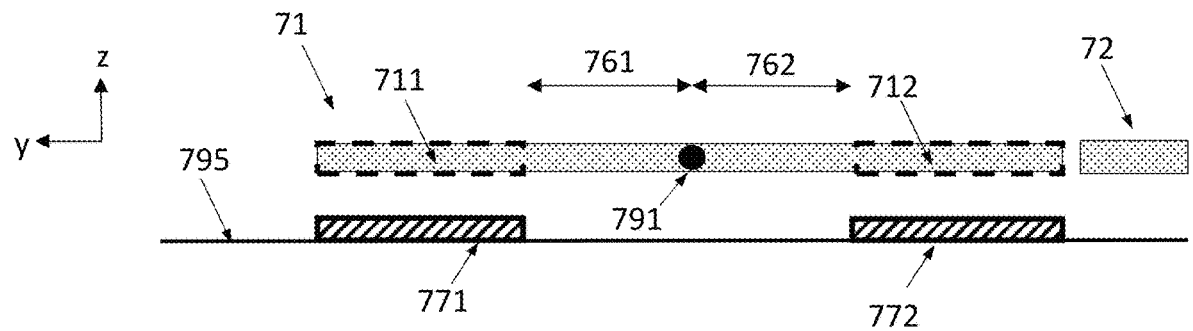

As mentioned above, the tilt angle of a proof mass can be measured capacitively with sensing electrodes (which may also be called counter-electrodes) attached to the proof mass and to an opposing fixed structure 795. FIGS. 7a-7b illustrate one alternative for how the sensing electrodes can be arranged with respect to the proof masses in any embodiment where the first and second rotation axes do not coincide. The anchor points and suspension structures have been omitted and the geometry of the proof masses simplified for clarity. Reference numbers 71, 72, 791 and 792 correspond to reference numbers 11, 12, 191 and 192, respectively, in FIG. 1b. FIG. 7b illustrates a yz-cross-section along the line A-A in FIG. 7a.

In FIGS. 7a-7b the y-coordinate of the first rotation axis 791 is greater than the y-coordinate of the second rotation axis 792 by a nonzero distance D. The accelerometer comprises a first counter-electrode 771 and a second counter-electrode 772 which are adjacent to the first proof mass 71 in the z-direction. The size and geometry of the first counter electrode 771 define a first measurement region 711 on the first proof mass 71 on a first side of the first rotation axis 791. The size and geometry of the second counter electrode 772 define a second measurement region 712 on the first proof mass 71 on a second side of the first rotation axis 791.

The accelerometer also comprises a third counter-electrode and a fourth counter-electrode (not illustrated) which are adjacent to the second proof mass 72 in the z-direction. The size and geometry of the third counter electrode define a third measurement region 721 on the second proof mass 72 on a first side of the second rotation axis 792. The size and geometry of the fourth counter-electrode define a fourth measurement region 722 on the second proof mass 72 on a second side of the second rotation axis 792.

The areas and shapes of the first, second, third and fourth measurement regions 711-712 and 721-722 may all be substantially equal in the xy-plane. The first measurement region 711 and the second measurement region 712 may be substantially reflection-symmetric with respect to the first rotation axis 791. The distances 761 and 762 illustrated in FIG. 7b, from the rotation axis to the edge of the two corresponding measurement regions, may be equal. The third measurement region 721 and the fourth measurement region 722 may be substantially reflection-symmetric with respect to the second rotation axis 792. The y-coordinate (illustrated by line 751) of the center of the first measurement 711 region may be greater than the y-coordinate (illustrated by line 753) of the center of the third measurement region 721 by the distance D.

Figure 7C:
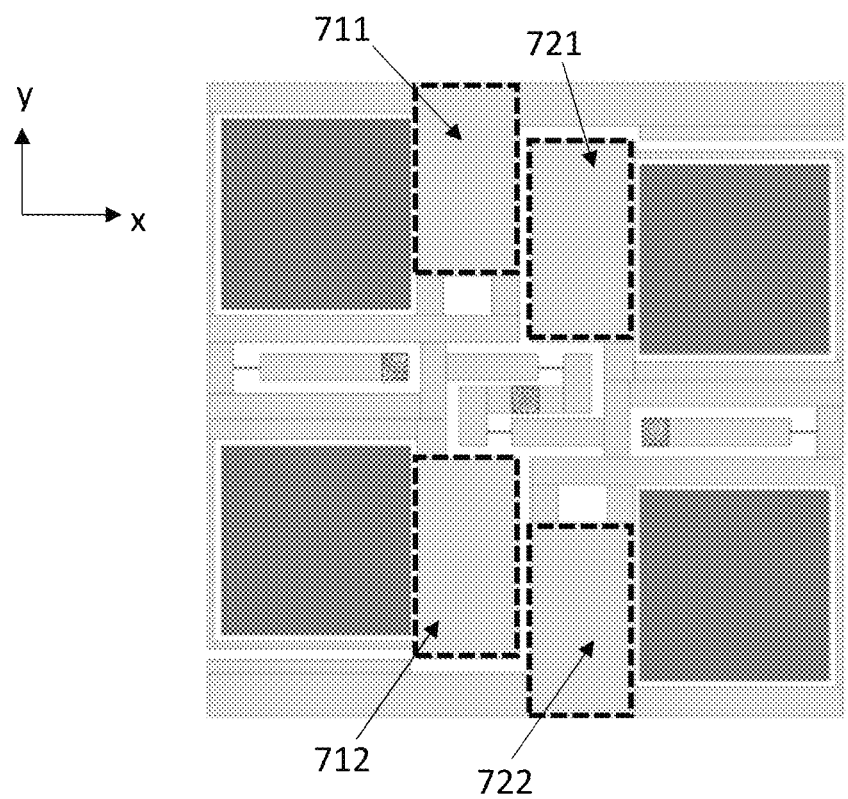

FIG. 7c illustrates how the measurement regions 711-712 and 721-722 may be arranged in the embodiment presented in FIG. 6b. Similar arrangements can be used in other embodiments. The geometries illustrated in FIGS. 7a-7c may be beneficial for example in applications where an output signal is measured with a double differential measurement (a differential measurement within each pair 711+712 and 721+722 and also between the two pairs).

The distance D between the rotation axes facilitates arrangements where the measurement regions can be placed far away from the rotation axes and where the proof masses are asymmetric with respect to their respective rotation axes, but the proof masses still consume as little surface area as possible.

The measurement regions 711-712 and 721-722 could comprise an electrode which has been deposited on the proof mass. Each electrode may have the same size and shape as the adjacent counter-electrode. However, the proof mass can be made of a semiconducting material such as silicon, and in this case the measurement can be carried out directly through the mass itself without the use of an additional electrode. The size and shape of the counter-electrode will then determine the size and shape of the measurement region on the proof mass.

The invention claimed is:

1. An accelerometer for measuring acceleration in the direction of a z-axis which is perpendicular to an xy-plane, comprising a first proof mass and a second proof mass, wherein the first proof mass is adjacent to the second proof mass, and the accelerometer further comprises one or more central anchor points located substantially between the first proof mass and the second proof mass, the accelerometer further comprises a first side anchor point and a second side anchor point, and wherein the first proof mass is suspended from the first side anchor point and from the one or more central anchor points with a first suspension structure, and the first suspension structure allows the first proof mass to undergo rotation about a first rotation axis, the second proof mass is suspended from the one or more central anchor points and from the second side anchor point with a second suspension structure, and the second suspension structure allows the second proof mass to undergo rotation about a second rotation axis, and the first and the second rotation axes are parallel to each other and define an x-direction which is parallel to the first and the second rotation axes and a y-direction which is perpendicular to the x-direction, the x-coordinate of the second side anchor point is greater than the x-coordinate of the first side anchor point, and the y-coordinate of the center of mass of the first proof mass is greater than the y-coordinate of the first rotation axis, and the y-coordinate of the center of mass of the second proof mass is less than the y-coordinate of the second rotation axis, the first suspension structure comprises a first torsion element which is attached between the first side anchor point and the first proof mass, and the first suspension structure also comprises a second torsion element which is attached between one of the one or more central anchor points and the first proof mass, the second suspension structure comprises a third torsion element which is attached between one of the one or more central anchor points and the second proof mass, and the second suspension structure also comprises a fourth torsion element which is attached between the second side anchor point and the second proof mass, and wherein the x-coordinate of the center of the first torsion element is less than the x-coordinate of the first side anchor point, and the x-coordinate of the center of the fourth torsion element is greater than the x-coordinate of the second side anchor point, and the x-coordinate of the first side anchor point is less than the x-coordinates of each of the one or more central anchor points, and the x-coordinate of the second side anchor point is greater than the x-coordinates of each of the one or more central anchor points.

2. The accelerometer according to claim 1, wherein the first suspension structure also comprises a substantially rigid first extension bar which extends from the first side anchor point to the first torsion element, and the second suspension structure comprises a substantially rigid second extension bar which extends from the second side anchor point to the fourth torsion element.

3. The accelerometer according to claim 1, wherein the x-coordinate of the center of the third torsion element is less than the x-coordinate of the center of the second torsion element.

4. The accelerometer according to claim 3, wherein the one or more central anchor points comprise one central anchor point, and the x-coordinate of the one central anchor point lies between the x-coordinate of the center of the second torsion element and the x-coordinate of the center of the third torsion element.

5. The accelerometer according to claim 3, wherein the one or more central anchor points comprise a first central anchor point and a second central anchor point, and the second torsion element is attached between the first central anchor point and the first proof mass, and the third torsion element is attached between the second central anchor point and the second proof mass.

6. The accelerometer according to claim 5, wherein the first and the second rotation axes coincide.

7. The accelerometer according to claim 6, wherein the first side anchor point, the second side anchor point, the first central anchor point and the second central anchor point all lie on the first and the second rotation axes.

8. The accelerometer according to claim 5, wherein the y-coordinate of the first rotation axis is greater than the y-coordinate of the second rotation axis.

9. The accelerometer according to claim 8, wherein the first side anchor point lies on the first rotation axis, the second side anchor point lies on the second rotation axis and the y-coordinates of the first and second central anchor points lie between the y-coordinate of the first rotation axis and the y-coordinate of the second rotation axis.

10. The accelerometer according to claim 1, wherein the first and the second rotation axes coincide.

11. The accelerometer according to claim 10, wherein the first side anchor point, the second side anchor point and the one central anchor point all lie on the first and the second rotation axes.

12. The accelerometer according to claim 1, wherein the accelerometer further comprises a first and a second element for measuring acceleration in the direction of the x-axis and/or the y-axis, and the first element is located in a first opening in the first proof mass, and the second element is located in a first opening in the second proof mass.

13. The accelerometer according to claim 12, wherein the accelerometer further comprises a third and a fourth element for measuring acceleration in the direction of the x-axis and/or the y-axis, and the third element is located in a second opening in the first proof mass, and the fourth element is located in a second opening in the second proof mass.

14. An accelerometer for measuring acceleration in the direction of a z-axis which is perpendicular to an xy-plane, comprising a first proof mass and a second proof mass, wherein the first proof mass is adjacent to the second proof mass, and the accelerometer further comprises one or more central anchor points located substantially between the first proof mass and the second proof mass, the accelerometer further comprises a first side anchor point and a second side anchor point, and wherein the first proof mass is suspended from the first side anchor point and from the one or more central anchor points with a first suspension structure, and the first suspension structure allows the first proof mass to undergo rotation about a first rotation axis, the second proof mass is suspended from the one or more central anchor points and from the second side anchor point with a second suspension structure, and the second suspension structure allows the second proof mass to undergo rotation about a second rotation axis, and the first and the second rotation axes are parallel to each other and define an x-direction which is parallel to the first and the second rotation axes and a y-direction which is perpendicular to the x-direction, the x-coordinate of the second side anchor point is greater than the x-coordinate of the first side anchor point, and the y-coordinate of the center of mass of the first proof mass is greater than the y-coordinate of the first rotation axis, and the y-coordinate of the center of mass of the second proof mass is less than the y-coordinate of the second rotation axis, the first suspension structure comprises a first torsion element which is attached between the first side anchor point and the first proof mass, and the first suspension structure also comprises a second torsion element which is attached between one of the one or more central anchor points and the first proof mass, the second suspension structure comprises a third torsion element which is attached between one of the one or more central anchor points and the second proof mass, and the second suspension structure also comprises a fourth torsion element which is attached between the second side anchor point and the second proof mass, and wherein the x-coordinate of the center of the first torsion element is less than the x-coordinate of the first side anchor point, and the x-coordinate of the center of the fourth torsion element is greater than the x-coordinate of the second side anchor point, wherein the x-coordinate of the center of the third torsion element is greater than the x-coordinate of the center of the second torsion element.

15. An accelerometer for measuring acceleration in the direction of a z-axis which is perpendicular to an xy-plane, comprising a first proof mass and a second proof mass, wherein the first proof mass is adjacent to the second proof mass, and the accelerometer further comprises one or more central anchor points located substantially between the first proof mass and the second proof mass, the accelerometer further comprises a first side anchor point and a second side anchor point, and wherein the first proof mass is suspended from the first side anchor point and from the one or more central anchor points with a first suspension structure, and the first suspension structure allows the first proof mass to undergo rotation about a first rotation axis, the second proof mass is suspended from the one or more central anchor points and from the second side anchor point with a second suspension structure, and the second suspension structure allows the second proof mass to undergo rotation about a second rotation axis, and the first and the second rotation axes are parallel to each other and define an x-direction which is parallel to the first and the second rotation axes and a y-direction which is perpendicular to the x-direction, the x-coordinate of the second side anchor point is greater than the x-coordinate of the first side anchor point, and the y-coordinate of the center of mass of the first proof mass is greater than the y-coordinate of the first rotation axis, and the y-coordinate of the center of mass of the second proof mass is less than the y-coordinate of the second rotation axis, the first suspension structure comprises a first torsion element which is attached between the first side anchor point and the first proof mass, and the first suspension structure also comprises a second torsion element which is attached between one of the one or more central anchor points and the first proof mass, the second suspension structure comprises a third torsion element which is attached between one of the one or more central anchor points and the second proof mass, and the second suspension structure also comprises a fourth torsion element which is attached between the second side anchor point and the second proof mass, and wherein the x-coordinate of the center of the first torsion element is less than the x-coordinate of the first side anchor point, and the x-coordinate of the center of the fourth torsion element is greater than the x-coordinate of the second side anchor point, wherein the x-coordinate of the center of the third torsion element is less than the x-coordinate of the center of the second torsion element, wherein the one or more central anchor points comprise a first central anchor point and a second central anchor point, and the second torsion element is attached between the first central anchor point and the first proof mass, and the third torsion element is attached between the second central anchor point and the second proof mass, and wherein the y-coordinate of the first rotation axis is less than the y-coordinate of the second rotation axis.

* * * * *